July 26, 1932.  G. GERALDSON  1,868,974
AGRICULTURAL IMPLEMENT
Filed June 29, 1931  2 Sheets-Sheet 1

INVENTOR.
GERALD GERALDSON
BY James A. Walsh,
ATTORNEY

July 26, 1932. G. GERALDSON 1,868,974
AGRICULTURAL IMPLEMENT
Filed June 29, 1931 2 Sheets-Sheet 2
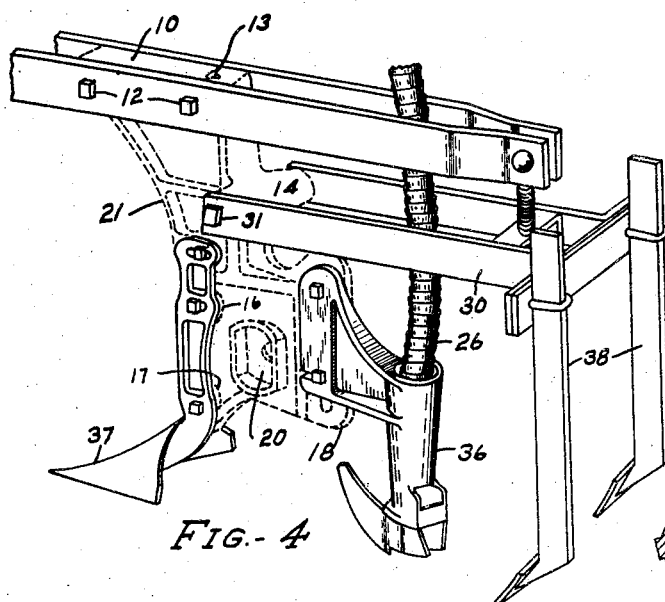
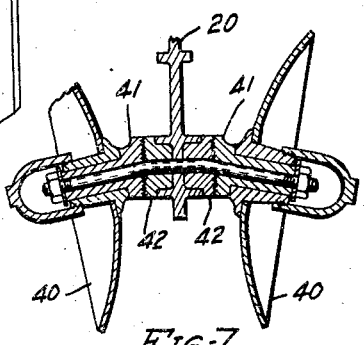
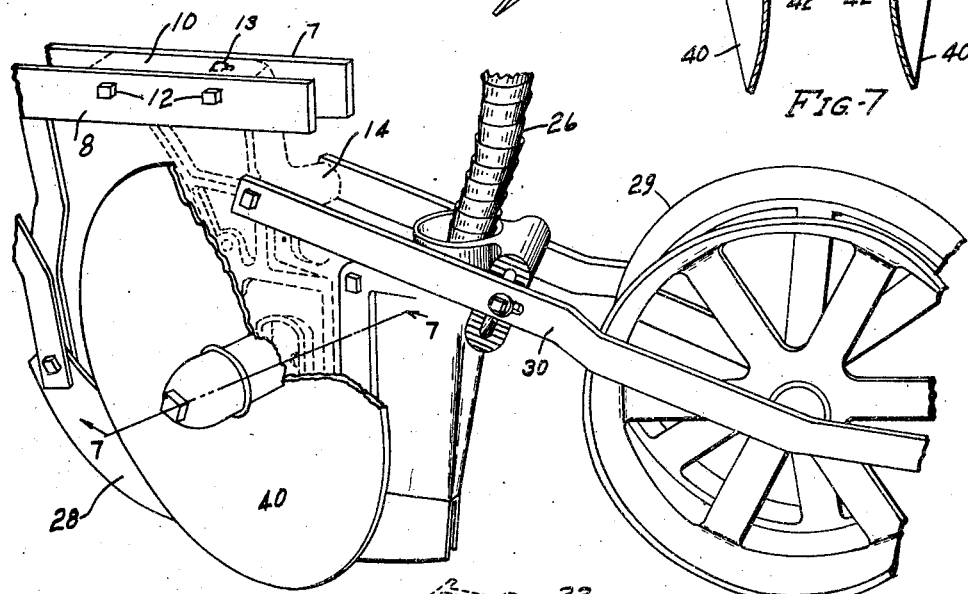
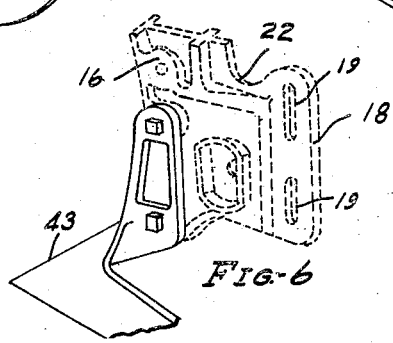
INVENTOR.
GERALD GERALDSON
BY James A. Walsh
ATTORNEY Patented July 26, 1932

1,868,974

UNITED STATES PATENT OFFICE

GERALD GERALDSON, OF RACINE, WISCONSIN, ASSIGNOR TO J. I. CASE COMPANY, OF RACINE, WISCONSIN, A CORPORATION

AGRICULTURAL IMPLEMENT

Application filed June 29, 1931. Serial No. 547,607.

As is well known, many agricultural implements are now being adapted for use in connection with tractors, some of which are in the form of equipment to be assembled with the tractor to function by its power, while others are connected fore or aft of the tractor to be pushed or pulled and operated thereby, in many instances the equipment for one purpose being of a character requiring the removal of considerable or all of its parts when it is desired to install implements for other purposes. It is my object, therefore, to provide simple and efficient means whereby various implement attachments may be so arranged as to be readily applied to a tractor to be as quickly removed and substituted by others in the manner to be hereinafter explained.

Figure 1:
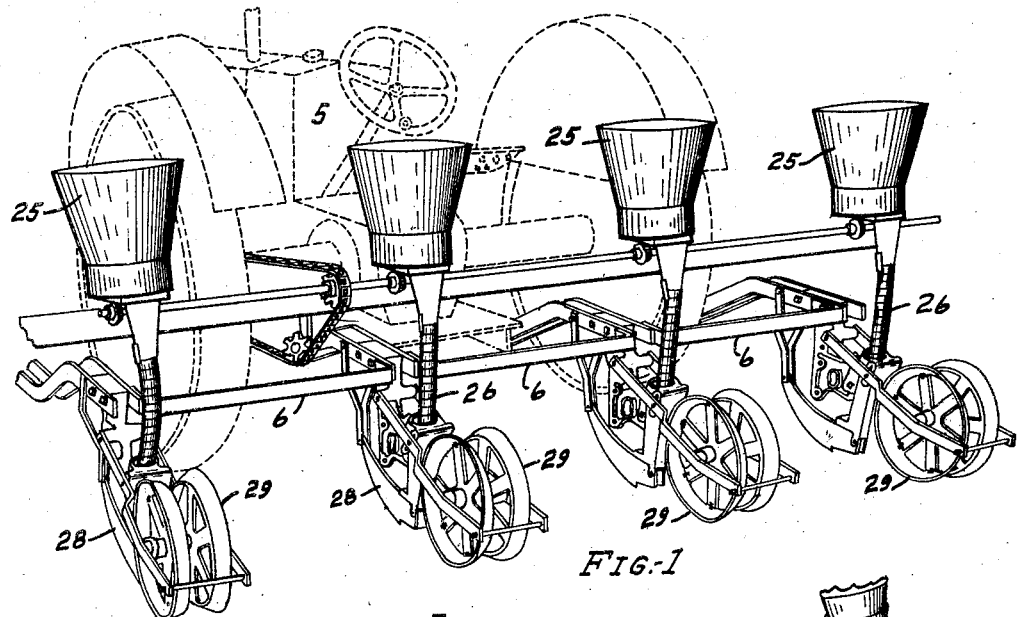
Figures 2, 3:
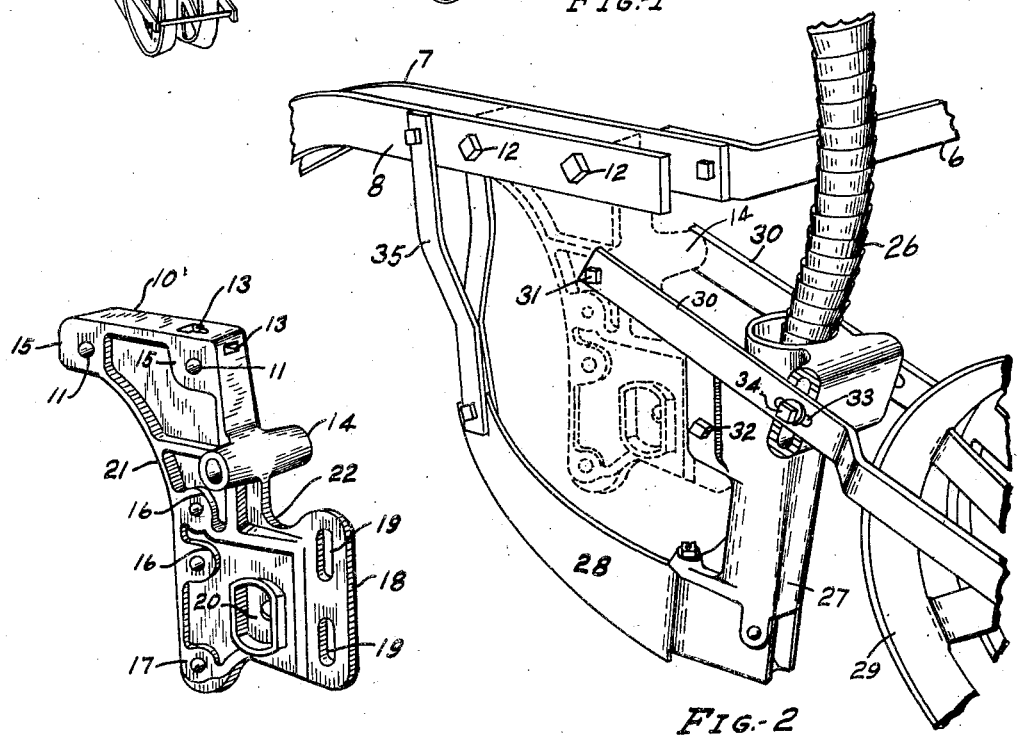

In the accompanying drawings, forming part thereof, Figure 1 is a perspective view in outline of a tractor equipped with planting devices of well known or desired construction shown in full lines, said view being illustrative of an example for the use of my improvement; Fig. 2, a perspective on an enlarged scale of a portion of a planter attached to a tractor by means of my improved supporting device; Fig. 3, a perspective of the device; Figs. 4, 5 and 6, perspective views showing other equipments attached to said supporting device; and Fig. 7 is a detail section taken on the dotted line 7—7 in Fig. 5.

In said drawings the numeral 5 indicates a tractor upon which a suitable frame, as 6, is mounted, and which may be of any practical construction and arrangement, that shown, Fig. 1, being in connected sections. Between the forwardly extending members 7, 8, of adjacent sections of the frame I secure my improved supporting device, commonly termed a universal bracket, which consists of the reinforced head 10 having holes 11 therethrough by which it is mounted in the frame members 7, 8, by bolts 12, and the head may be provided with further openings 13 for the mounting of other elements thereon. As indicated in Fig. 3, said bracket embodies a transverse bearing 14, bosses 15, 16, 17, the tool-holder 18 having openings 19 for the attachment of a tool thereto, and the disk bearing 20, the bracket, as will be understood, being preferably cast from a single piece of metal having the curved front wall 21 and the rear depression 22 between the bearing 14 and tool-holder 18.

In Figs. 1 and 2 a planter embodying a plurality of seed cans 25, tubes 26, boots 27, runner openers 28, and press wheels 29, illustrates an implement which may be connected to the tractor by means of my improved device, the supporting frames 30 of the planter units being pivotally mounted, at 31, in the bracket bearing 14, and the boots 27 connected to the tool-holder 18 by bolts 32, the boot having a slotted guide 33 associated therewith to which the frame 30 is connected by a bolt 34 whereby vertical play may be imparted to the press wheels 29 in a well known manner, the runner opener 28 being connected to the frame 6 by a yoke 35 as is common. Fig. 4 shows an implement including a planting device 36 connected to the tool-holder 18 in the manner described, a sweep 37 being connected to the bosses 16, 17, while the frame 30 is provided with tools 38 capable of vertical adjustment through its pivotal connection with bearing 14. Fig. 5 illustrates also the attachment of the planter equipment shown in Fig. 2 with complementary disk openers 40 supported in the disk bearing 20 by the axle 41 in a well known manner substantially as indicated in Fig. 7 so that the angle of the disks may be adjusted as conditions require; while Fig. 6 shows a further example of the utility of my device whereby a single tillage tool 43 is connected to the bosses at the forward side of the device, the latter being indicated by dotted lines in fragment.

From the foregoing it will be apparent that one or more of my improved devices may be associated with a tractor by means of a supplemental frame or other attachment, and that a multiplicity of earth working tools for a variety of purposes may be readily secured to and removed therefrom in the simple manner disclosed, by which means I obviate the necessity of maufacturing, shipping and storing an extensive assortment of special, and frequently complicated, attachments for the assemblage and retention of the many types of tillage, planting and other tools commonly employed in connection with tractors.

I claim as my invention:

1. In a device for the attachment of agricultural implements to a tractor, a head, means for attaching the head to the implement, a bearing adjacent and positioned in transverse relation to the head for pivotally supporting an earth working tool connected therewith, means adjacent said bearing for supporting disk openers, a tool-holder adjacent the bearing having means for detachably connecting a tool thereto, and means on the device at the opposite side of the tool-holder for detachably securing a tool thereto.

2. In a device of the character described having means for attachment to a frame, a bearing arranged in transverse relation to the attaching means for pivotally supporting an earth working tool connected therewith, a tool-holder having means for connecting a tool thereto, and means adjacent the tool-holder for detachably mounting a disk opener therein.

3. In a device of the character described including means attachable to an implement frame, a bearing arranged in transverse relation to the attaching means for supporting an earth working tool connected therewith, a tool-holder adjacent the bearing having means for connecting a tool thereto, and means on the device at the opposite side of the tool-holder for supporting a tool, said device being formed of a single piece of material.

4. In a device of the character described having means attachable to an implement frame, a bearing arranged in transverse relation to the attaching means for supporting an earth working tool connected therewith, a vertically arranged apertured tool-holder on the device, means between the bearing and tool-holder for supporting disk openers, and means associated with the device at the opposite side of the tool-holder for removably securing a tool thereto.

5. A device of the character described comprising an integrally formed attachable head, bosses to which an earth working tool may be secured, a bearing arranged in transverse relation to the head to which a tool may be pivotally connected to move vertically, a bearing beneath the transverse bearing for supporting disk openers, and a tool-holder having means to which a tool may be attached.

6. A device for the attachment of implements to a tractor, comprising a head attachable to an implement frame and depending from the latter, a front portion having means to which an implement may be detachably connected, a rear portion including a tool-holder, means in advance of the tool-holder for supporting a disk opener, and a bearing between the head and tool-holder for supporting a tool, said device being composed of a single piece of material.

7. A universal bracket for the attachment of implements to a tractor, including means for connecting the bracket to the tractor, means for pivotally connecting an implement to the bracket, means for connecting an earth working tool to the bracket, means for mounting a disk opener in the bracket, and means for securing a tillage tool to the bracket.

In testimony whereof I affix my signature.

GERALD GERALDSON.